United States Patent
Sharda et al.

(10) Patent No.: US 10,067,860 B2
(45) Date of Patent: Sep. 4, 2018

(54) DEFINING TEST BED REQUIREMENTS

(71) Applicant: VMWARE, INC., Palo Alto, CA (US)

(72) Inventors: Rishi Kant Sharda, Bangalore (IN); Vineet Sinha, Bangalore (IN); Prasenjit Sarkar, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 157 days.

(21) Appl. No.: 14/271,471

(22) Filed: May 7, 2014

(65) Prior Publication Data
US 2015/0269062 A1    Sep. 24, 2015

(30) Foreign Application Priority Data
Mar. 22, 2014  (IN) ............................ 1523/CHE/2014

(51) Int. Cl.
*G06F 11/36* (2006.01)

(52) U.S. Cl.
CPC ...... *G06F 11/3688* (2013.01); *G06F 11/3664* (2013.01)

(58) Field of Classification Search
CPC ............. G06F 11/3688; G06F 11/3664; G06F 11/3672
See application file for complete search history.

(56) References Cited

U.S. PATENT DOCUMENTS

| | | | |
|---|---|---|---|
| 2009/0217302 A1* | 8/2009 | Grechanik | G06F 8/70 719/320 |
| 2013/0046787 A1* | 2/2013 | Ford | G06F 17/3056 707/779 |
| 2014/0282421 A1* | 9/2014 | Jubran | G06F 11/3664 717/126 |

OTHER PUBLICATIONS

Virtual machine, https://en.wikipedia.org/w/index.php?title=Virtual_machine&oldid=735499584 (last visited Aug. 21, 2016), pp. 1-5.*

* cited by examiner

*Primary Examiner* — Kyle Vallecillo
(74) *Attorney, Agent, or Firm* — Thomas Horstemeyer, LLP (57) ABSTRACT

Systems and techniques are described for defining test bed requirements. A described technique includes receiving data specifying a first test to be performed for a software application. The data identifies test bed requirements for the first test. Data identifying characteristics of each of available test beds are obtained. Each available test bed includes one or more computing resources on which software tests are performed. The characteristics of each available test bed specify characteristics of the one or more computing resources included in the available test bed. A determination is made that the characteristics of a particular test bed of the available test beds satisfy the test bed requirements for the first test. In response to determining that the characteristics of the particular test bed satisfy the test bed requirements, the first test is performed using the particular test bed.

20 Claims, 3 Drawing Sheets

DEFINING TEST BED REQUIREMENTS

RELATED APPLICATION

Benefit is claimed under 35 U.S.C. 119(a)-(d) to Foreign application Serial No. 1523/CHE/2014 filed in India entitled "DEFINING TEST BED REQUIREMENTS", filed on Mar. 22, 2014, by VMware. Inc., which is herein incorporated in its entirety by reference for all purposes.

BACKGROUND

This document relates to defining test bed requirements for a test.

Software applications are often tested using a test bed that is made up of computing resources, such as hardware, software, and/or network components. For example, a test bed may include one or more computers connected to a network. To properly execute a particular test, the test bed for the particular test may be required to meet certain constraints or requirements. For example, a particular type of user interface test framework and/or a particular amount of memory may be required to properly perform a test for a user interface. If the test bed used to perform the test does not meet the requirements for the test, then the performance of the test may fail to detect failures or may cause false alarms for test failures that are actually due to the non-conforming test bed.

SUMMARY

In general, one aspect of the subject matter described in this document can be embodied in a technique that includes receiving data specifying a first test to be performed for a software application, the data identifying test bed requirements for the first test; obtaining data identifying characteristics of each of a plurality of available test beds, each available test bed including one or more computing resources on which software tests are performed, wherein the characteristics of each available test bed specify characteristics of the one or more computing resources included in the available test bed; determining that the characteristics of a particular test bed of the available test beds satisfy the test bed requirements for the first test; and in response to determining that the characteristics of the particular test bed satisfy the test bed requirements, causing the first test to be performed using the particular test bed.

These and other aspects can optionally include one or more of the following features. In some aspects, the test bed requirements are described in metadata attached to the first test. Aspects can include parsing the data identifying the test bed requirements; determining whether the parsed data conforms to syntax of a particular test execution and deployment constraint language; and in response to determining that the parsed data conforms to the syntax, extracting the test bed requirements from the parsed data.

Aspects can include receiving second data specifying a second test to be performed, the second data identifying second test bed requirements for the second test; determining that none of the available test beds satisfy the second test bed requirements; and in response to determining that none of the available test beds satisfy the second test bed requirements, generating a new test bed that satisfies the second test bed requirements using one or more available computing resources. In some aspects, generating the new test bed includes identifying the one or more available computing resources from a set of computing resources based on the second test bed requirements and characteristics of the available computing resources.

In some aspects, the test bed requirements include one or more constraints of computing resources used to perform the first test. In some aspects, the test bed requirements include a test engine framework with which the first test is compatible to run.

In some aspects, the data specifies the test bed requirements using a group identifier, the group identifier identifying a group of one or more test bed requirements. In some aspects, the data further specifies one or more additional test bed requirements for the test bed, the one or more additional test bed requirements being in addition to the test bed requirements specified using the group identifier.

Particular embodiments of the subject matter described in this document can be implemented so as to realize one or more of the following advantages. Software tests can be performed more accurately and more effectively by identifying or deploying a test bed that meets the requirements for the software test. Users can more readily specify requirements for a test bed by including the requirements as metadata of the test data. Users can also more easily specify requirements for a test bed by selecting from pre-defined test bed requirement groups, and optionally specifying additional requirements not specified by the selected group. Proper test beds can be identified more accurately and more easily by a test system by receiving data specifying requirements for the test bed with the test data.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document generally describes techniques for identifying a test bed for a test, e.g., a software test, based on test bed requirements. A test bed is a computing environment configured to perform software tests, for example, under particular constraints. A test bed may include computing resources, such as hardware, networking resources, software, e.g., operating system(s), system software, and/or the software to be tested, and/or other computing resources.

A software test may include, for example, steps, modules, or routines to be executed by the software to test the software and data for use during the test. For example, a test may include routines to evaluate how the software reacts to particular inputs or to receiving particular data before placing the software into production. A software test may be designed to test particular portions of the software, such as user interface features or data processing features of the software. The results of the test may then be evaluated to determine whether any changes to the software should be made.

A user may specify requirements, constraints, or other features of a test bed for a particular software test in metadata attached to a file, document, or other data specifying the particular software test. The test bed requirements can include, for example, hardware and/or software requirements, networking constraints, and/or data defining a test engine framework for the test. The data specifying the test and the metadata specifying the test bed requirements can be provided to a test system.

The test system can extract the test bed requirements from the metadata and compare the requirements to the characteristics of a set of available test beds. If a particular test bed satisfies or meets the test bed requirements, the test system may cause the test to be performed using the particular test bed. If none of the test beds in the set satisfy the test bed requirements, a test bed that satisfies the test bed requirements may be generated and deployed, for example, using available computing resources.

Figure 1:
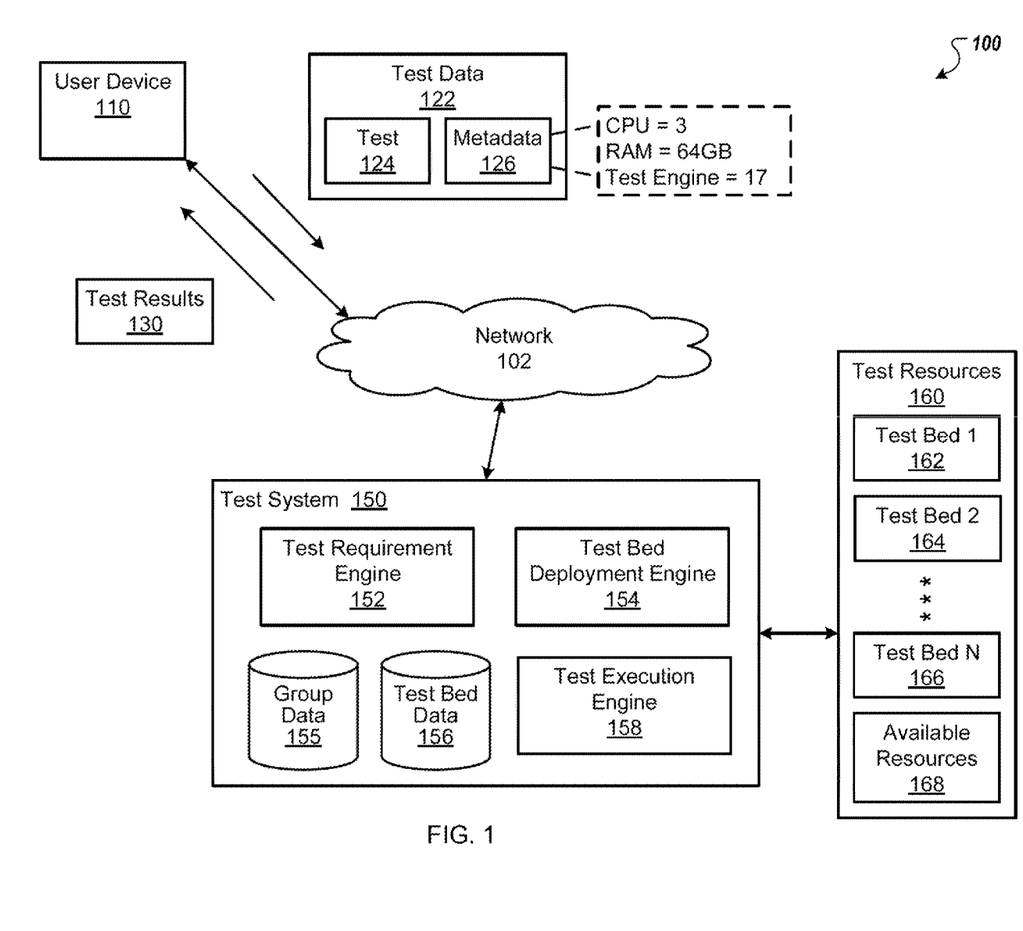
FIG. 1 shows an example environment in which a test system performs software tests.

FIG. 1 shows an example environment 100 in which a test system 150 performs software tests. The example environment 100 includes a network 102, such as a local area network (LAN), wide area network (WAN), e.g., the Internet, or a combination thereof. The network 102 connects user devices, such as the user device 110, with the test system 150.

The user device 110 is an electronic device, e.g., a computer, that can send to the test system 150 test data 122 that specifies a software test 124 to be performed by the test system 150. For example, a user may configure a test 124 using the user device 110 and submit test data 122 that specifies the test 124 to the test system 150. The test data 122 may specify steps, routines, modules, data, and so on, for use in performing the test 124 and/or other aspects of a software application to be tested. For example, the test 124 may include several steps for receiving and processing data with the software application that is being tested. If the test includes the creation of a test user, the data may include a user name, the user's role and other data related to the test user. For a test related to provisioning a virtual machine, the data may include the name of the virtual machine, a template identifier from which the virtual machine may be cloned, and/or other data related to the virtual machine and the management of the virtual machine.

The user can also specify test bed requirements for the test 124. As described above, a test bed is an environment that includes computing resources on which a test can be performed. A particular test may require certain test bed characteristics in order for the test to be performed properly. For example, a data processing intensive test may require a minimum (or a particular) number of central processing units (CPUs) necessary to perform the processing for the test and a minimum (or a particular) amount of available memory in order for data to be processed correctly during the test. The test bed requirements may include requirements or other characteristics of computing resources used in performing a test, such as the minimum number of CPUs and the minimum amount of memory.

The test bed requirements may also specify a test engine framework for performing the test. A test engine framework may include software, e.g., separate from the software being tested, that manages or aids in the execution of a software test. A test engine framework may include utilities, modules, and/or other tools for defining and executing a test. For example, a test engine framework may include a utility that enables a user to define steps to be performed during a software test. A test engine framework may also include pre-defined modules that can be selected and used in software tests. During the test, the test engine framework may cause the software being tested to perform the defined steps and collect data related to the performance of the steps.

As test beds may include different test engine frameworks and tests may be generated for, or compatible with, particular test engine frameworks, the test engine framework required for a particular test may be defined as a test bed requirement. For example, a user interface test may require a particular user interface test engine framework that is capable of automating web browser tests, e.g., capable of automating web browser commands that would be submitted by users in a production environment. A user can specify the particular user interface test engine framework, requirements of computing resources used in performing the test, and other test bed requirements using the user device 110.

In some implementations, the test bed requirements are specified in metadata 126 attached to, or included with, the test 124 or test data 122. For example, the user may generate a document or other type of file that specifies the test 124. The user may also specify requirements of the test bed for the test 124 in metadata attached to the document or other file. In this way, the test bed requirements can be received by the test system 150 along with the test 124 to be performed. In the illustrated example, the metadata 126 specifies a number of CPUs (3), an amount of memory (64 GB), and test engine framework number 17.

In some implementations, the test system 150 may provide a language (e.g., a test execution and deployment constraint language) that allows users to add to a test 124 metadata that specifies test bed requirements for the test 124. For example, the language may define a syntax for specifying test bed requirements so that the requirements can be parsed by the test system 150. Users can then specify the test bed requirements for the test 124 using the provided language. When the test bed requirements are received, the test system 150 can identify the test bed requirements by parsing the metadata using the language syntax. In some implementations, as described in more detail below, a test requirement engine 152 of the test system 150 parses and interprets the metadata 126 attached to a test 124, validates the syntax of the test execution and deployment constraint language, and compiles the set of test bed requirements for the test 124.

The test execution and deployment constraint language may allow the user to specify requirements for each computing resource and/or test engine framework that is to be used to perform the test. An example of the language defining constraints for a particular test is: "@TestExecutionConstraint(testFramework-"unitTest", CpuCount=4, Memory=8 GB)." In this example, a "unitTest" test engine framework is required along with 4 CPUs and 8 gigabytes (GB) of memory.

The test execution and deployment constraint language may also allow users to define required components, e.g., backend servers, front-end servers, applications, and so on, and characteristics of each component. An example of language defining a component and its characteristics is: "@TestExecutionConstraint (Component="BackendServer", requirements=(ServerCount="3", CpuCount="4", Memory="8 GB"). In this example, the test requires 3 backend servers, each having 4 CPUs and 8 GB of memory.

The test execution and deployment constraint language may also allow the users to define requirements for test constraint categories, such as different test categories. For example, code of an application may be tested in several different ways, each having different test bed requirements. A user may use the language to specify test bed requirements for each category of test for the application. An example of language for defining a category is: "@(TestExecutionConstraint(Category="Scale", Components="Backend Server", requirements={ServerCount="4", CpuCount="4", Memory="8 GB"}, Component="WebServer", requirements={"Component="ServerCount="4", CpuCount="4", Memory="8 GB"}). In this example, the category "Scale" includes test bed requirements of 4 backend servers that have 4 CPUs and 8 GB of memory, and 4 web servers that have 4 CPUs and 8 GB of memory.

The test execution and deployment constraint language may also allow the user to define a group of test bed requirements ("requirement group") that can be used, for example, to specify constraints or requirements for multiple tests. A requirement group may include a set of test bed requirements and each requirement group may be associated with a group identifier that uniquely identifies the requirement group. If multiple different tests require the same test bed requirements, a requirement group that identifies the requirements may be generated to allow quicker selection of that group's test bed requirements. For example, there may be several tests for a particular software application (or for multiple different applications) and each test may have the same test bed requirements. Instead of specifying each individual test bed requirement for each test, the test system 150 may allow the user to save a requirement group that identifies the test bed requirements. Thereafter, the user may specify, e.g., in the metadata for each test, the group identifier for the requirement group that should be used for the test rather than each individual test bed requirement. Data related to requirement groups may be stored in a requirement group data store 155, as described below.

In some cases, the test data may specify a group identifier for a requirement group and additional test bed requirements can also be specified along with the group identifier for a requirement group. For example, a requirement group may include some of the test bed requirements for a particular test. However, the particular test may also require one or more additional test bed requirements that are not included in the requirement group. In such an example, the user may specify the appropriate requirement group and also specify additional test bed requirements, e.g., in the metadata for the test. Example language for specifying a requirement group and additional resources is "@TestExecutionConstraintGroup(name="Functional", requirements={CpuCount="10"}). In this example, the language specifies the requirement group "Functional" and an additional requirement of 10 CPUs.

The user device 110 can send the test data 122 that includes the test 124 and the metadata 126 that specifies the test bed requirements to the test system 150 by way of the network 102. The test system 150 can receive the test data 120 and perform the test 124 using an appropriate test bed that is selected using the requirements specified by the metadata 126. The example test system 150 includes a test requirement engine 152, a test bed deployment engine 154, a test execution engine 158, a requirement group data store 155, and a test bed data store 156. In addition, the test system 150 is communicably coupled, e.g., by way of a network or direct connection, to test resources 160.

The test resources 160 include a number of test beds 162-166 and available resources 168. Each test bed 162-168 includes one or more computing resources with which software tests can be performed. For example, each test bed 162-166 may include computing hardware, software, networking components, one or more test engine frameworks, and/or other resources. Some of the test beds 162-166 may include different resources than other test beds 162-166. For example, the test bed 162 may include four CPUs, while the test bed 164 may include eight CPUs. Of course, the test beds 162 and 164 can include many other components, such as memory, operating systems, hypervisors for managing the execution of virtual machines, test engine frameworks, and/or software applications.

Characteristics of each test bed 162-166 may be stored in the test bed data store 156. For example, the test bed data store 156 may include, for each test bed 162-166, data identifying characteristics of computing resources included in the test bed 162-166. These characteristics can include, for each computing resource of the test bed, a quantity of the computing resource included in the test bed, performance data for the computing resource, version or model data for the computing resource, software installed on the computing resource, compatibility data for the computing resource, and/or other data that describes the computing resource. If a test bed includes a test engine framework, the characteristics of the test bed may also identify the test engine framework.

The available resources 168 include computing resources that can be used to generate a test bed for a test. For example, as described in more detail below, the test system 150 may generate a test bed from the available resources 168 if there are no available tests beds that satisfy the requirements of a particular test. For example, there may not be an available test bed 162-166 if none of the test beds satisfy the test bed requirements for the test, or if the test bed(s) that do satisfy the test bed requirements are not available, e.g., because they are in use for another test. The available resources 168 can include computing hardware, software, networking components, test engine frameworks, and/or other computing resources.

The test requirement engine 152 receives the test data 122 from user devices 110 and identifies test bed requirements for a test 124 specified by the test data 122. For example, if the test bed requirements are stored in metadata 126 attached to the test data 122, the test requirement engine 122 can detect the metadata 126 and extract the test bed requirements from the metadata 126. The test requirement engine 152 may be configured to parse the metadata 126 for each received test and evaluate the parsed data to determine whether the test data 122 includes requirements specified using the test execution and deployment constraint language. For example, the test requirement engine 152 may be configured to determine whether the metadata 126 includes text that includes the text "IaTest", "@TestExeuctionConstraint" or some other text or indicator that indicates that the text contains test bed requirements.

In response to determining that the metadata 126 includes text written in the test execution and deployment constraint language, the test requirement engine 152 may validate the syntax of the test execution and deployment constraint language. For example, the test requirement engine 152 may compare the identified text to one or more rules that govern the syntax of the test execution and deployment constraint language.

If the text has the proper syntax, e.g., the text satisfies the rule(s), the test requirement engine 152 may compile the set of requirements included in the text. For example, the test requirement engine 152 may evaluate the text to identify certain identifiers, such as "testFramework=", and extract parameters that follow the identifier. In this example, the test requirement engine 152 may extract, from text that follows the identifier, a parameter that identifies the test engine framework for the test.

If the test bed requirements are specified using a group identifier for a requirement group, e.g., the text identifies a requirement group, the test requirement engine 152 can retrieve the individual test bed requirements for the identified requirement group from the requirement group data store 155. The requirement group data store 155 may store, for each requirement group, the group identifier for the requirement group and the test bed requirements associated with the group. When the test requirement engine 152 receives data specifying a group identifier for a requirement group, the test bed requirement engine 152 can retrieve the test bed requirements for the group using the group identifier.

The test requirement engine 152 can provide the test 124 and the test bed requirements for the test 124 to the test bed deployment engine 154. The test bed deployment engine 154 can use the test bed requirements to identify an appropriate test bed for the test 124. In some implementations, the test bed deployment engine 154 compares the test bed requirements for the test 124 to characteristics of each available test bed 162-166. For example, the test bed deployment engine 154 may obtain the characteristics of each test bed 162-166 from the test bed data store 156 and compare the characteristics of each test bed 162-166 to the test bed requirements for the test 124. If the characteristics of a particular test bed satisfy the test bed requirements for the test 124, the test bed deployment engine 154 may interact with the test execution engine 158 to perform the test using the particular test bed. For example, the test bed requirements may specify exactly three CPUs, a particular operating system, and at least 128 GB of memory. If the test bed 164 has three CPUs, the particular operating system, and at least 128 GB of memory, the test bed 164 may be used to perform the test.

If none of the test beds 162-166 satisfy the test bed requirements, the test bed deployment engine 154 may generate a new test bed using available resources 168. For example, if the test bed requirements specify three servers having certain characteristics, the test bed deployment engine 156 may identify three servers of the available resources that have those characteristics. The test bed deployment engine 154 may then interact with the test execution engine 158 to perform the test using the three servers. If the test bed deployment engine 154 cannot identify available resources 168 that satisfy the test bed requirements, the test system 150 may send a message to the user device 110 indicating that there are no conforming test beds for the test.

The test execution engine 158 interacts with test beds 162-166 and test beds generated from available resources 168 to perform tests 124. For example, the test execution engine 158 may install and/or initialize a software application to be tested on an appropriate test bed. The test execution engine 158 may then cause steps, functions, or routines of the test to be performed by the software application using the computing resources in the test bed. For example, the test execution engine 158 may interact with a test engine framework installed on a computer of the test bed to perform the test. If the test bed does not include a test engine framework, the test execution engine 158 may manage the execution of the test, for example, by causing the software to perform steps or routines of the test. In some implementations, the test execution engine 158 may include one or more test engine frameworks for managing the execution of software tests. The test execution engine 158 may also collect data related to the test, e.g., from the test engine framework. This data may be sent to the user device 110 as test results 130 after the test is performed.

Figure 2:
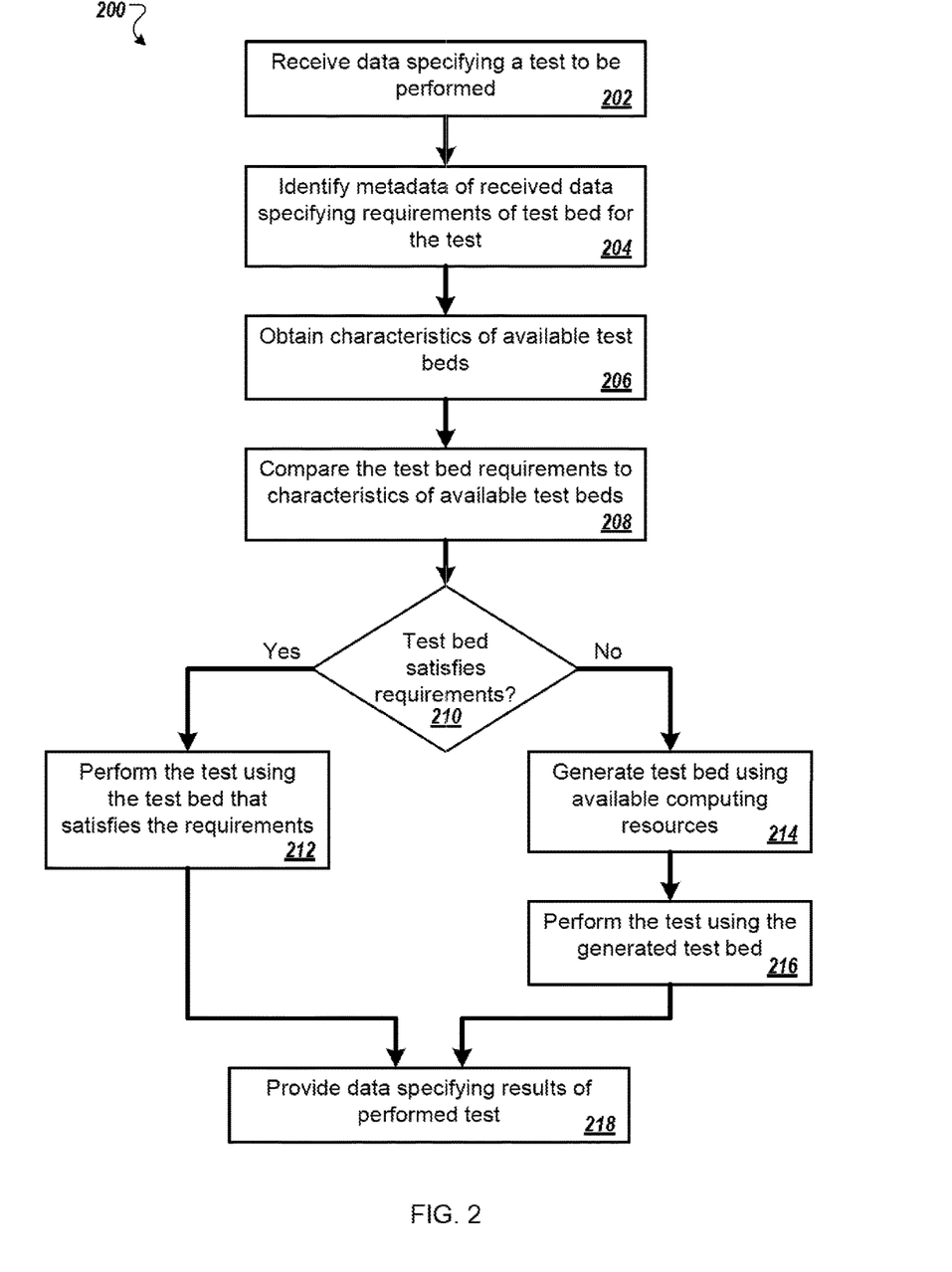
FIG. 2 is a flow chart of an example technique for identifying a test bed for performing a software test and performing the software test.

FIG. 2 is a flow chart of an example technique 200 for identifying a test bed for performing a software test and performing the software test. The example technique 200 is performed by a system of one or more computers. For example, the technique 200 may be performed by the test system 150 of FIG. 1.

At block 202, the system receives data specifying a test to be performed. The test may be a software test and may include steps or routines to be performed using the software. A user may configure the test and submit data specifying the test to the test system 150, for example, using a user device 110.

The test data may also specify one or more requirements or characteristics of a test bed on which the test is to be performed. For example, a user may specify minimum or actual requirements of the test bed. The test bed requirements may include requirements related to computing resources, e.g., hardware, software, or network components, of a test bed and/or requirements related to a test engine framework used to perform the test. For example, the test bed requirements may identify that a minimum amount of a resource, an actual amount of a resource, a minimum performance of a resource, and/or a specific test engine framework.

The test bed requirements may be included in metadata attached to the test or the data that specifies the test. For example, the test may be stored in a document or other type of file. The test bed requirements may be stored in metadata of the document or file or other data associated with the document or file. A user may specify the test bed requirements in the metadata by specifying a particular requirement group and/or identifying particular test bed requirements.

At block 204, the system identifies data, e.g., metadata, that specifies the test bed requirements. For example, the test requirement engine 152 may identify the metadata and extract the test bed requirements from the metadata. In response to identifying the metadata, the test requirement engine 152 may parse the text included in the metadata and evaluate the syntax of the parsed text for conformance with the test execution and deployment constraint language. If the parsed text conforms to the test execution and deployment constraint language, the test requirement engine 152 may evaluate text to identify the test bed requirements specified by the text and compile a list of test bed requirements included in the text. If the metadata includes a group identifier for a requirement group, the test requirement engine 152 may obtain the test bed requirements for the group associated with the group identifier, for example, from the group requirement data store 155.

At block 206, the system obtains characteristics of available test beds. For example, the test bed deployment engine 154 may obtain characteristics of available test beds 162-166 from the test bed data store 156. The characteristics of an available test bed may include, for example, data identifying hardware, software, networking components, test engine frameworks, and/or other resources or components of the test bed. For each resource or component, the characteristics may also include an amount of the resource included in the test bed, data regarding the performance of the resource, compatibility data for the resource, and/or other appropriate data regarding the resource.

At block 208, the system compares the test bed requirements to characteristics of the available test beds. For example, the available test beds may include existing, or pre-configured, test beds that are available for performing a test. If an existing test bed is currently performing a test and is unable to perform another test, then that test bed may not be considered an available test bed.

The test bed deployment engine 154 may compare each test bed requirement to the characteristics of each of the available test bed 162-166. For example, if the test bed requirements specify a minimum amount of memory, the test deployment engine 154 may compare the minimum amount of memory to the amount of memory of each available test bed 162-166.

At block 210, the system determines whether any of the test beds of the available test beds satisfy the test bed requirements based on the comparison. For example, if a test bed satisfies each test bed requirement specified in the metadata of the received test, the test bed may be deemed to satisfy the test bed requirements. A test bed that fails to satisfy one or more of the test bed requirements may be deemed to not satisfy the test bed requirements.

If a particular test bed satisfies the test bed requirements, the system performs the test using the particular test bed (212). For example, the test bed deployment engine 154 may interact with the test execution engine 158 to perform the test using the particular test bed. The test bed deployment engine 154 may provide to the test execution engine 158 the test and data identifying the particular test bed. In turn, the test execution engine 158 may interact with the particular test bed to perform the test. For example, if the test bed includes a test engine framework, the test execution engine 158 may provide data specifying the test to the test engine framework. In turn, the test engine framework may manage the execution of the test using the computing resources of the test bed. For example, the test engine framework may cause the software being tested to complete steps of the test and record data related to the performed steps. The test engine framework may also provide data specifying test results, e.g., the recorded data, to the test execution engine 158, for example, after the test is performed.

If the test bed does not include a test engine framework, the test execution engine 158 may manage the execution of the test using the computing resources of the test bed. For example, the test execution engine 158 may cause the software being tested to perform steps of the test and record data related to the performed steps.

If more than one test bed satisfies the test bed requirements, then one of the conforming test beds may be selected. The test bed may be selected based on the characteristics of the test beds. For example, if a particular conforming test bed has a higher performance rating for one of the resources required by the test bed requirements than the other conforming test beds, the particular conforming test bed may be selected for performing the test.

At block 214, if none of the available test beds satisfy the test bed requirements, the system may deploy a new test bed using available resources. In some implementations, the test deployment engine 154 evaluates characteristics of a set of available computing resources, such as the available resources 168, to identify a subset of resources that satisfy the test bed requirements. The test deployment engine 154 may compare characteristics of the available resources to the test bed requirements to identify a subset of resources that satisfy the requirements. For example, if the test bed requirements specify a particular test engine framework installed on a server having certain characteristics, the test engine deployment engine 154 may compare characteristics of servers included in the set of available resources to determine whether one of the servers has the certain characteristics and the test engine framework installed thereon.

If the test bed deployment engine 154 identifies a subset of the available resources to satisfy the test bed requirements, the test bed deployment engine 154 may generate a test bed from the subset of available resources, as described in more detail below. If not, the system may inform the user device 110 that the test cannot be performed using a conforming test bed.

At block 216, if the system identifies a subset of the available resources that satisfy the test bed requirements and generates a test bed using the identified resources, the system performs the test using the generated test bed. For example, the test bed deployment engine 154 may provide to the test execution engine 158 data specifying the test and data specifying the resources of the generated test bed. In turn, the test execution engine 158 may interact with resources of the generated test bed to perform the test.

At block 218, the system provides data specifying the results of the performed test. For example, the test execution engine 158 may receive data specifying results of the test while the test is being performed. After the test is completed, the test system 150 may send to the user device 110 test result data specifying the results of the test.

Figure 3:
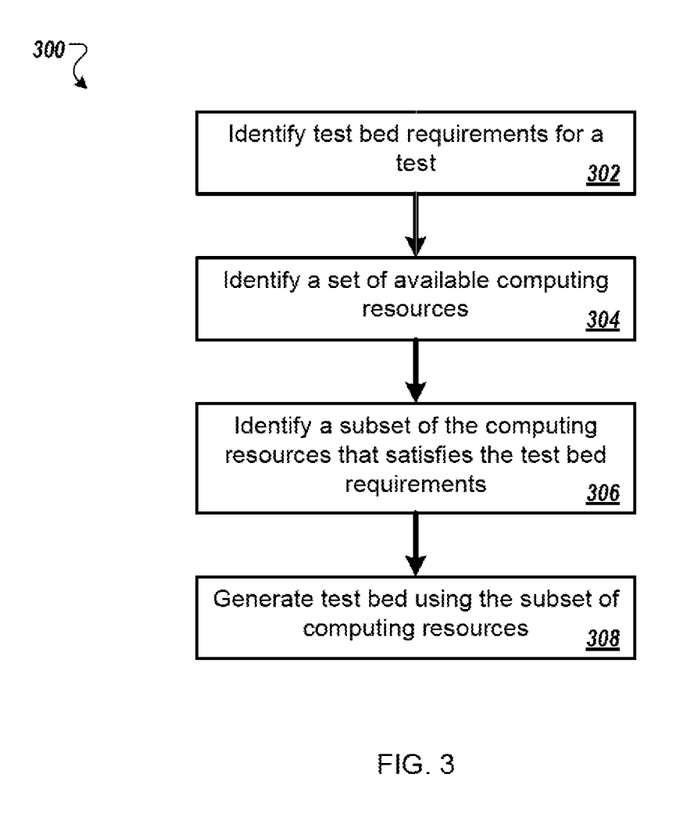
FIG. 3 is a flow chart of an example technique for generating a test bed.

FIG. 3 is a flow chart of an example technique 300 for generating a test bed. The technique 300 may be performed, for example, in response to a determination that no available test beds satisfy test bed requirements for a particular test. The example technique 300 is performed by a system of one or more computers. For example, the technique 300 may be performed by the test system 150 of FIG. 1.

At block 302, the system identifies test bed requirements for a test. As described above, the test bed requirements may be included with data specifying the test. For example, the test bed requirements may be identified in metadata attached to the data specifying the test. The test requirement engine 152 may identify and extract the test bed requirements from the data specifying the test.

At block 304, the system identifies a set of available computing resources. In some implementations, the set of available computing resources may include computing resources that have not been assigned to a particular test bed. For example, the system may include additional computing resources that are free to be used in creating new or custom test beds to satisfy test bed requirements that may not be met by existing test beds. In some implementations, the set of available computing resources may include computing resources assigned to particular test beds and optionally computing resources that are not assigned to a particular test bed. For example, the computing resources of existing test beds, or the test beds themselves, may be combined with other computing resources or other test beds to generate a new or custom test bed.

In addition to identifying the available computing resources, the system may identify characteristics of each available computing resource, such as performance characteristics, quantities of the resource, compatibility characteristics, and/or other appropriate characteristics. For example, the test bed deployment engine 154 may identify the available computing resources and/or their characteristics.

At block 306, the system identifies a subset of the available computing resources that satisfies the test bed requirements. In some implementations, the test bed deployment engine 154 may compare the test bed requirements to characteristics of each available computing resource in an attempt to identify at least one computing resource that satisfies each test bed requirement. For example, if the test bed requirements specify a computer having a particular number of processors and a particular amount of memory, the test bed deployment engine 154 may attempt to identify a computer in the available computing resources that has the particular number of processors and the particular amount of memory. If the test bed requirements also specify a redundant data storage unit networked to the computer, the test bed deployment engine 154 may also attempt to identify a data storage unit that is networked to the computer or that can be networked to the computer.

As described above, computing resources of existing test beds or the test beds themselves may be eligible for use in creating a test bed. For example, if a particular test bed satisfies a portion of the test bed requirements, but not all of the requirements, the system may identify computing resources to meet the non-satisfied requirements and combine the identified resources with the particular test bed to satisfy the test bed requirements.

At block 308, the system generates a test bed using the identified subset of available computing resources. To generate the test bed using the resources, the test bed deployment engine 154 may install the software to be tested on at least one computer of the identified resources. In some cases, additional actions may be taken by the test bed deployment engine 154 to generate a conforming test bed. For example, two or more computers may need to be configured to communicate with each other. The test bed deployment engine 154 may configure the computers to communicate. By way of another example, the test bed deployment engine 154 may install a test engine framework on a computer that otherwise satisfies the test bed requirements but does not include the required test engine framework.

Once the test bed is generated, the system can perform the test using the generated test bed. In addition, data identifying the resources used to generate the test bed can be stored so that the test bed can be regenerated for future tests that have the same or similar test bed requirements.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, by a processor, data specifying a first test to be performed for a software application, the data identifying test bed requirements for the first test;
   obtaining, by the processor, data identifying characteristics of each of a plurality of available test beds, each available test bed including an allocation of one or more computing resources on which software tests are performed, wherein the characteristics of each available test bed specify hardware characteristics and software characteristics of the one or more computing resources included in the available test bed;
   parsing, by the processor, the data identifying the test bed requirements;
   determining, by the processor, whether the parsed data conforms to a syntax of a particular test execution and deployment constraint language by comparing the parsed data to one or more rules associated with the particular test execution and deployment constraint language;
   in response to determining that the parsed data conforms to the syntax, extracting, by the processor, the test bed requirements from the parsed data by identifying a parameter identifier associated with a test bed requirement parameter;
   determining, by the processor, that the characteristics of a particular test bed satisfy the test bed requirements for the first test by comparing available memory associated with the particular test bed and a minimum amount of memory associated with the test bed requirements for the first test; and
   in response to determining that the characteristics of the particular test bed satisfy the test bed requirements for the first test, causing, by the processor, the first test to be performed on the software application using the particular test bed, wherein test data is transmitted to the particular test bed and used by the particular test bed to execute the first test.

2. The computer-implemented method of claim 1, further comprising:
   receiving second data specifying a second test to be performed, the second data identifying second test bed requirements for the second test;

determining that none of the available test beds satisfy the second test bed requirements; and in response to determining that none of the available test beds satisfy the second test bed requirements, generating a new bed that satisfies the second test bed requirements using one or more available computing resources.

3. The computer-implemented method of claim 2, wherein generating the new test bed comprises identifying the one or more available computing resources from a set of computing resources based on the second test bed requirements and characteristics of the one or more available computing resources.

4. The computer-implemented method of claim 1, wherein the test bed requirements include one or more constraints of computing resources used to perform the first test.

5. The computer-implemented method of claim 1, wherein the test bed requirements include a test engine framework with which the first test is compatible to run.

6. The computer-implemented method of claim 1, wherein the data specifies the test bed requirements using a group identifier, the group identifier identifying a group of one or more test bed requirements.

7. The computer-implemented method of claim 6, wherein the data further specifies one or more additional test bed requirements for the test bed, the one or more additional test bed requirements being in addition to the test bed requirements specified using the group identifier.

8. A system comprising:
a data processing apparatus; and
a memory apparatus in data communication with the data processing apparatus and storing instructions executable by the data processing apparatus and that upon such execution cause the data possessing apparatus to perform operations comprising:
receiving data specifying a first test to be performed for a software application, the data including metadata identifying one or more test bed requirements for the first test;
obtaining data identifying characteristics of each of a plurality of available test beds, each available test bed including an allocation of one or more computing resources on which software tests are performed, wherein the characteristics of each available test bed specify characteristics of the one or more computing resources included in the available test bed;
parsing the metadata identifying the test bed requirements;
determining whether the parsed metadata conforms to a syntax of a particular test execution and deployment constraint language by comparing the parsed metadata to one or more rules associated with the particular test execution and deployment constraint language;
in response to determining that the parsed metadata conforms to the syntax, extracting the test bed requirements from the parsed metadata by identifying a parameter identifier associated with a test bed requirement parameter;
determining that the characteristics of a particular test bed meet the test bed requirements for the first test by comparing available memory associated with the particular test bed and a minimum amount of memory associated with the test bed requirements; and in response to determining that the characteristics of the particular test bed satisfy the test bed requirements for the first test, causing the first test to be performed using the particular test bed.

9. The system of claim 8, wherein the operations further comprise:
receiving second data specifying a second test to be performed, the second data identifying second test bed requirements for the second test;
determining that none of the available test beds satisfy the second test bed requirements; and
in response to determining that none of the available test beds satisfy the second test bed requirements, generating a new test bed that satisfies the second test bed requirements using one or more available computing resources.

10. The system of claim 9, wherein generating the new test bed comprises identifying the one or more available computing resources from a set of computing resources based on the second test bed requirements and characteristics of the available computing resources.

11. The system of claim 8, wherein the test bed requirements include one or more constraints of computing resources used to perform the first test.

12. The system of claim 8, wherein the test bed requirements include a test engine framework with which the first test is compatible to run.

13. The system of claim 8, wherein the metadata specifies the test bed requirements using a group identifier that identifies a group of one or more test bed requirements.

14. The system of claim 13, wherein the metadata further specifies one or more additional test bed requirements for the test bed, the one or more additional test bed requirements being in addition to the test bed requirements specified using the group identifier.

15. A non-transitory computer storage medium encoded with a computer program, the program comprising instructions that when executed by a data processing apparatus cause the data processing apparatus to perform operations comprising:
receiving data specifying a first test to be performed for a software application, the data identifying test bed requirements for the first test;
obtaining data identifying characteristics of each of a plurality of available test beds, each available test bed including an allocation of one or more computing resources on which software tests are performed;
parsing the data identifying the test bed requirements;
determining whether the parsed data conforms to a syntax of a particular test execution and deployment constraint language by comparing the parsed data to one or more rules associated with the particular test execution and deployment constraint language;
in response to determining that the parsed data conforms to the syntax, extracting the test bed requirements from the parsed data by identifying a parameter identifier associated with a test bed requirement parameter;
determining that the characteristics of a particular test bed satisfy the test bed requirements for the first test by comparing available computing resources associated with the particular test bed and a minimum computing resources requirement associated with the test bed requirements; and
in response to determining that the characteristics of the particular test bed satisfy the test bed requirements for the first test, causing the first test to be performed on the software application using the particular test bed.

16. The non-transitory computer storage medium of claim 15, wherein the characteristics of each available test bed specify characteristics of the one or more computing resources included in the available test bed.

17. The non-transitory computer storage medium of claim 15, wherein the operations further comprise:
   receiving second data specifying a second test to be performed, the second data identifying second test bed requirements for the second test;
   determining that none of the available test beds satisfy the second test bed requirements; and
   in response to determining that none of the available test beds satisfy the second test bed requirements, generating a new test bed that satisfies the second test bed requirements using one or more available computing resources.

18. The non-transitory computer storage medium of claim 15, wherein determining that the characteristics of the particular test bed satisfy the test bed requirements for the first test further comprises comparing available central processing units (CPU) associated with the particular test bed and a minimum number of CPUs associated with the test bed requirements for the first test.

19. The non-transitory computer storage medium of claim 15, wherein determining that the characteristics of the particular test bed satisfy the test bed requirements for the first test further comprises comparing available memory associated with the particular test bed and a minimum amount of memory associated with the test bed requirements for the first test.

20. The non-transitory computer storage medium of claim 15, wherein determining that the characteristics of the particular test bed satisfy the test bed requirements for the first test comprises identifying a subset of the available test beds that satisfy the test bed requirements, wherein the subset of the available test beds comprises the particular test bed, and wherein the operations further comprise selecting the particular test bed from the subset of the available test beds based at least in part on a performance rating associated with the particular test bed.

* * * * *